(12) United States Patent
Boada et al.

(10) Patent No.: US 11,119,764 B2
(45) Date of Patent: Sep. 14, 2021

(54) AUTOMATED EDITING TASK MODIFICATION

(71) Applicant: INTERNATIONAL BUSINESS MACHINES CORPORATION, Armonk, NY (US)

(72) Inventors: Jason Boada, Danbury, CT (US); Jeremy Chase, New York, NY (US); Qin Shirley Held, Midland Park, NJ (US); Rachel Cohen, Brooklyn, NY (US); Munish Goyal, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 16/426,239

(22) Filed: May 30, 2019

(65) Prior Publication Data

US 2020/0379755 A1    Dec. 3, 2020

(51) Int. Cl.
*G06F 9/44* (2018.01)
*G06F 8/77* (2018.01)
(Continued)

(52) U.S. Cl.
CPC .............. *G06F 8/77* (2013.01); *G06F 8/71* (2013.01); *G06F 9/451* (2018.02);
(Continued)

(58) Field of Classification Search
CPC ... G06F 8/71; G06F 8/77; G06F 9/451; G06F 16/93; G06F 16/24578; G06N 20/00
See application file for complete search history.

(56) References Cited

U.S. PATENT DOCUMENTS

| 7,107,518 B2 | 9/2006 | Ramaley |
| 7,818,678 B2 | 10/2010 | Massand |

(Continued)

OTHER PUBLICATIONS

Balakrishna, Sowmya Vajjala; Analyzing Text Complexity and Text Simplification: Connecting Linguistics, Processing and Educational Applications; Dissertation submitted in fulfillment of the requirements for the degree of doctor of Faculty of Philosophy at Eberhard Karls University of Tubingen; 2015; 300 pages.

(Continued)

*Primary Examiner* — Chat C Do
*Assistant Examiner* — Lenin Paulino
(74) *Attorney, Agent, or Firm* — Schmeiser, Olsen & Watts; Stephanie Carusillo

(57) ABSTRACT

A method and system for improving document lifecycle editing and storage technology is provided. The method includes enabling interactions between a user and a hardware controller. Editor profiles associated with editing privileges of the user are generated. The editor profiles include parameters generated based on a performance of past edits. The editing tasks are automated task difficulty attributes associated with a difficulty of executing the editing tasks are generated. The editing tasks may include readability and consolidation tasks. An optimized version of the editing tasks is assigned to software editors and time periods associated with the software editors completing the editing tasks are tracked. The optimized version of the editing tasks is generated based on the editor profiles and new tasks for assignment. User permissions and alerts are monitored and recommendation actions associated with the editing tasks are generated. The editing tasks are modified for future execution.

17 Claims, 7 Drawing Sheets

(51) Int. Cl.

| | |
|---|---|
| *G06F 9/451* | (2018.01) |
| *G06N 20/00* | (2019.01) |
| *G06F 16/93* | (2019.01) |
| *G06F 8/71* | (2018.01) |
| *G06F 16/2457* | (2019.01) |

(52) U.S. Cl.
CPC ........ *G06F 16/24578* (2019.01); *G06F 16/93* (2019.01); *G06N 20/00* (2019.01)

(56) References Cited

U.S. PATENT DOCUMENTS

| | | | |
|---|---|---|---|
| 8,131,756 B2 | 3/2012 | Carus | |
| 8,165,974 B2 | 4/2012 | Privault | |
| 9,502,031 B2 | 11/2016 | Paulik | |
| 9,916,306 B2 | 3/2018 | Van Den Oever | |
| 2007/0220479 A1* | 9/2007 | Hughes | G06Q 30/02 717/100 |
| 2008/0134298 A1* | 6/2008 | Nathan | G06F 8/20 726/4 |
| 2009/0094086 A1 | 4/2009 | Bruno | |
| 2009/0106239 A1 | 4/2009 | Getner | |
| 2010/0293451 A1 | 11/2010 | Carus | |
| 2010/0332217 A1 | 12/2010 | Wintner | |
| 2012/0284344 A1 | 11/2012 | Costenaro | |
| 2012/0324369 A1 | 12/2012 | Safa | |
| 2013/0151238 A1 | 6/2013 | Beaurpere | |
| 2014/0207439 A1 | 7/2014 | Venkatapathy | |
| 2015/0058282 A1 | 2/2015 | Saraya | |
| 2017/0220536 A1 | 8/2017 | Chiba | |
| 2017/0236407 A1 | 8/2017 | Rhoads | |
| 2018/0060302 A1 | 3/2018 | Liang | |
| 2018/0102062 A1 | 4/2018 | Livni | |
| 2018/0173698 A1 | 6/2018 | Dubey | |
| 2018/0267950 A1 | 9/2018 | De Mello Brandao | |
| 2018/0330000 A1 | 11/2018 | Noble | |
| 2019/0005049 A1 | 1/2019 | Mittal | |
| 2019/0050389 A1 | 2/2019 | Kinder | |
| 2020/0005118 A1 | 1/2020 | Chen | |
| 2020/0007380 A1 | 1/2020 | Chen | |
| 2020/0160458 A1* | 5/2020 | Bodin | G06F 11/302 |

OTHER PUBLICATIONS

Friedman, Mark J.; List of IBM Patents or Patent Applications Treated as Related; May 30, 2019; 1 page.

* cited by examiner

AUTOMATED EDITING TASK MODIFICATION

This invention was made with government support under contract number GS00Q09BGD0034 awarded by U.S. General Services Administration. The government has certain rights to this invention.

FIELD

The present invention relates generally to a method for automating editing tasks of a user and in particular to a method and associated system for improving software editing technology associated with automating software editing tasks, generating actions associated with the software editing tasks, and modifying the editing tasks for future execution.

BACKGROUND

Typical document systems allow for little flexibility with respect automated functionality. Manual systems document restructuring methods may implement a complicated process that may be time consuming and require a large amount of resources. Additionally, detecting actions for efficient software execution may require technically advanced equipment for enabling automated functionality.

SUMMARY

A first aspect of the invention provides a machine learning document lifecycle editing and memory reorganization method comprising: enabling, by a user interface via a processor of a hardware controller, interactions between a user and the hardware controller; generating, by the processor executing a profile engine of the hardware controller, editor profiles associated with editing privileges of the user, wherein the editor profiles comprise parameters associated with editor productivity attributes with respect to task types executed by the user; assigning, by the processor executing the profile engine, the user to specified documents; automating, by the processor executing a cognitive recommendation engine of the hardware controller, editing tasks of the user, wherein the editing tasks are associated with the task types, and wherein the editing tasks comprise standardization tasks, readability improvement tasks, cross-document consolidation tasks, topical coherence tasks, and spelling and grammatical error tasks; generating, by the processor executing an effort requirement engine of the hardware controller, task difficulty attributes associated with a difficulty of executing the editing tasks; assigning, by an optimization engine of the hardware controller based on the task difficulty attributes and the editor profiles, an optimized version of the editing tasks to software editors; tracking, by the processor, time periods associated with the software editors completing the editing tasks; monitoring, by an approval flow manager engine of the hardware controller, user permissions and alerts associated with approvals required to continue an editing task review process; generating, by the processor based on results of the monitoring, recommendation actions associated with the editing tasks; and modifying, by the processor based on the recommendation actions and detected user activity associated with the editing tasks, the editing tasks for future execution.

A second aspect of the invention provides a computer program product, comprising a computer readable hardware storage device storing a computer readable program code, the computer readable program code comprising an algorithm that when executed by a processor of a hardware controller implements a machine learning document lifecycle editing and memory reorganization method, the method comprising: enabling, by a user interface via the processor, interactions between a user and the hardware controller; generating, by the processor executing a profile engine of the hardware controller, editor profiles associated with editing privileges of the user, wherein the editor profiles comprise parameters associated with editor productivity attributes with respect to task types executed by the user; assigning, by the processor executing the profile engine, the user to specified documents; automating, by the processor executing a cognitive recommendation engine of the hardware controller, editing tasks of the user, wherein the editing tasks are associated with the task types, and wherein the editing tasks comprise standardization tasks, readability improvement tasks, cross-document consolidation tasks, topical coherence tasks, and spelling and grammatical error tasks; generating, by the processor executing an effort requirement engine of the hardware controller, task difficulty attributes associated with a difficulty of executing the editing tasks; assigning, by an optimization engine of the hardware controller based on the task difficulty attributes and the editor profiles, an optimized version of the editing tasks to software editors; tracking, by the processor, time periods associated with the software editors completing the editing tasks; monitoring, by an approval flow manager engine of the hardware controller, user permissions and alerts associated with approvals required to continue an editing task review process; generating, by the processor based on results of the monitoring, recommendation actions associated with the editing tasks; and modifying, by the processor based on the recommendation actions and detected user activity associated with the editing tasks, the editing tasks for future execution.

A third aspect of the invention provides a hardware controller comprising a processor coupled to a computer-readable memory unit, the memory unit comprising instructions that when executed by the computer processor implements a machine learning document lifecycle editing and memory reorganization method comprising: enabling, by a user interface via the processor, interactions between a user and the hardware controller; generating, by the processor executing a profile engine of the hardware controller, editor profiles associated with editing privileges of the user, wherein the editor profiles comprise parameters associated with editor productivity attributes with respect to task types executed by the user; assigning, by the processor executing the profile engine, the user to specified documents; automating, by the processor executing a cognitive recommendation engine of the hardware controller, editing tasks of the user, wherein the editing tasks are associated with the task types, and wherein the editing tasks comprise standardization tasks, readability improvement tasks, cross-document consolidation tasks, topical coherence tasks, and spelling and grammatical error tasks; generating, by the processor executing an effort requirement engine of the hardware controller, task difficulty attributes associated with a difficulty of executing the editing tasks; assigning, by an optimization engine of the hardware controller based on the task difficulty attributes and the editor profiles, an optimized version of the editing tasks to software editors; tracking, by the processor, time periods associated with the software editors completing the editing tasks; monitoring, by an approval flow manager engine of the hardware controller, user permissions and alerts associated with approvals required to continue an editing task review process; generating, by the processor based on results of the monitoring, recommendation actions associated with the editing tasks; and modifying, by the processor based on the recommendation actions and detected user activity associated with the editing tasks, the editing tasks for future execution.

The present invention advantageously provides a simple method and associated system capable of implementing document action automated systems for efficient software execution.

DETAILED DESCRIPTION

Figure 1:
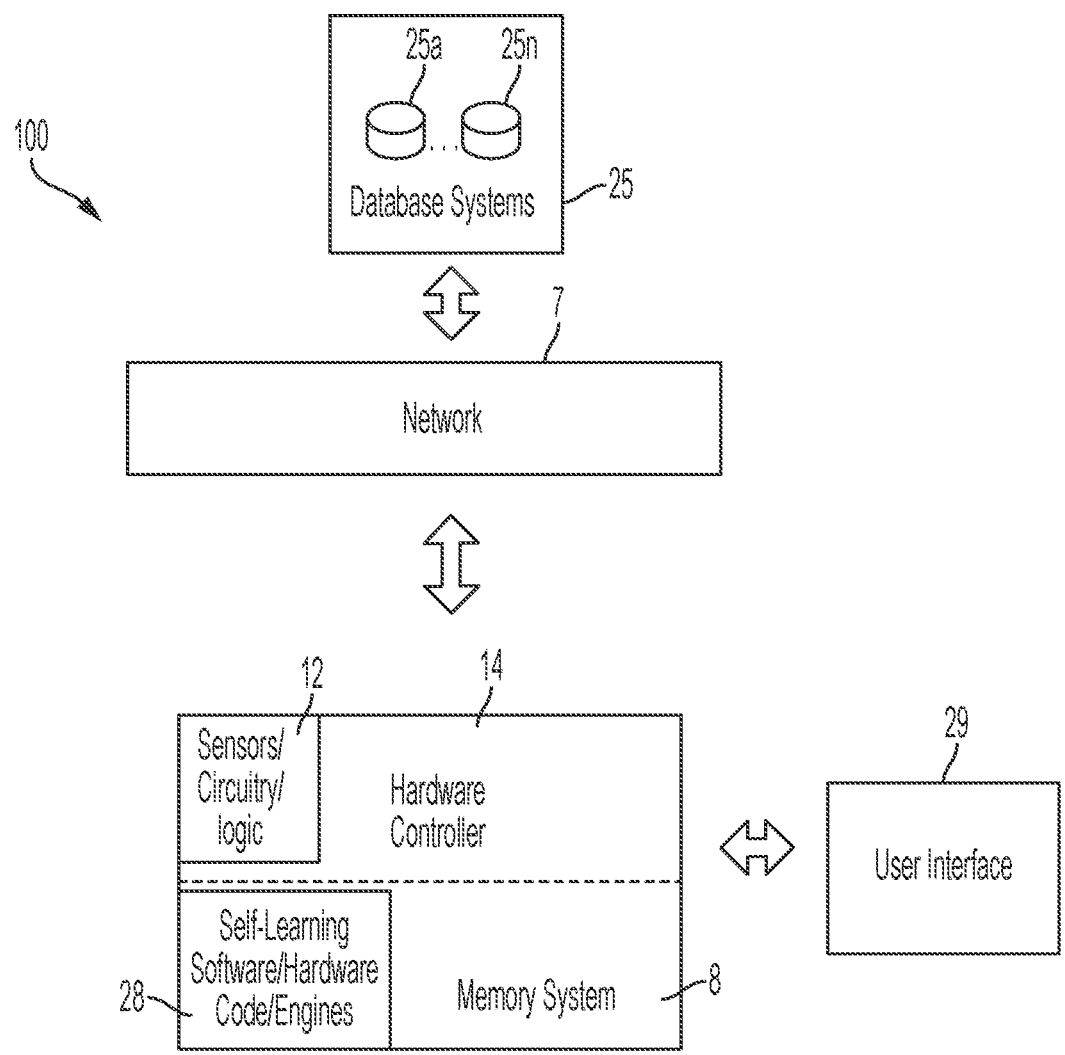
FIG. 1 illustrates a system for improving software editing technology associated with automating software editing tasks, generating actions associated with the software editing tasks, and modifying the editing tasks for future execution, in accordance with embodiments of the present invention.

FIG. 1 illustrates a system 100 for improving software editing technology associated with automating software editing tasks, generating actions associated with the software editing tasks, and modifying the editing tasks for future execution, in accordance with embodiments of the present invention. Organizations typically possess large bodies of documents containing information intended to be read and understood by its members (e.g., policy documentation, legal/regulation compliance documents, contracts, learning materials, etc.). The documents are often subject to a (periodic) review process associated with a reevaluation with respect to a relevancy of the documents given changes in directives or requirements, changes to operations, and/or changes to the values guiding the organization. The review process may include editing existing documents by determining what may remain in a document as is versus what may need to be modified or deleted as well as creating new documents or consolidating several existing documents into a single document. Additionally, an approval process may be implemented. A complexity of the aforementioned process may require considerable manual work and a multitude of existing technologies for implementation. Typical document management systems exist alongside text editors for editing, creating, and consolidating documents. Text editors typically provide no automation functionality with respect to the aforementioned tasks. Likewise, any typical automation tasks are restricted to flagging and providing suggestions for misspelled words or problematic grammar. Additional aspects of the review process (e.g., rewriting text to make it more understandable or identifying areas of overlap across documents for consolidation) may be performed manually with no automation. Typical review processes may also include mandates from management to apply across a corpus of documents. For example, an organization may decide to provide expansions for all acronyms used in documents to facilitate understanding of the documents and existing text editors provide no mechanism for implementing this expansion. Therefore, system 100 comprises a cognitive system designed to manage an entire document review process. System 100 enables automation for adding and storing documents, monitoring when documents come up for review, editing documents, providing edit recommendations, creating and consolidating documents, managing a review approval process, and formatting and rebuilding the document when the editing process is complete. Likewise system 100 combines all components and processes of document review within a single system and enables cognitive automation to a document management process. System identifies potential areas for review tasks. As editors are assigned to the tasks, system 100 learns editor skill sets to assist components to identify resources for automatically completing editing tasks. System 100 identifies an effort required to complete a document review and users/hardware are best suited to complete this effort.

System 100 comprises hardware/software modules for executing a document review process that includes: document storage functions, version control throughout a review, editing tasks execution, approval flow management, and document formatting and exporting. Additionally, system 100 executes a cognitive automation process for identifying tasks required to complete a document review and for identifying the best resources (editors) to execute the tasks. Editing tasks may be retrieved form from natural language processing engines including, inter alia, text standardization tasks (e.g., acronym expansion), recommendations to improve text readability, identification of areas of overlap (within a single document or across multiple documents) for consolidation, identification of a document's topical consistency (e.g., identifying whether a document (or a section) presents a topic in a concise way), identifying spelling and grammatical errors, etc. Furthermore, system 100 is configured to incorporate organizational domain-specific requirements (e.g., the identification of specialized/technical terms and managing and/or standardizing definitions). The aforementioned tasks promote consistency of terminology across documents and may be used to automatically create glossaries of term definitions and/or acronym expansions.

System 100 is configured to track each task identified as well as user responses to the tasks. System 100 is configured to analyze which actions are executed (e.g., did user: accept a recommendation, ignore the task, or provide their own solution?) and change approvals.

Based on the action execution analysis, system 100 may adjust recommendations (tasks identified) based on user activity. For example, if system 100 initially suggests that a document associated with two topics should be separated into two documents, but users consistently ignore that recommendation, system 100 may modify its functionality to become more lenient. As a further example, if a user provides their own solution to a word replacement designed to improve readability, system 100 may adjust its future recommendations based on the user input. The aforementioned software model improvements may be limited to different parts of an organization to ensure that users receive only the most relevant recommendations for their documents.

Alternatively (based on the action execution analysis), system 100 may use the analysis of edits for building editor profiles. System 100 monitors which edits a user makes and an overall success rate of the edits to identify editor skill sets and productivity rates thereby allowing system 100 to aid management in assigning editors to document reviews based on the linguistic nature of the tasks required, the volume of tasks, and the document review deadline.

System 100 of FIG. 1 includes a hardware controller 14, database systems 25, and a user interface 29 interconnected through a network 7. Hardware controller 14 comprises sensors/circuitry/logic 12 and a (specialized) memory system 8. Memory system 8 comprises software code/engines 28 including executable code. Memory system 8 may include a single memory system. Alternatively, memory system 8 may include a plurality of memory systems. Hardware controller 14, database systems 25, and user interface 29 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware controller 14, database systems 25, and user interface 29 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-7. The specialized discrete non-generic analog, digital, and logic-based circuitry (e.g., sensors/circuitry/logic 12, etc.) may include proprietary specially designed components (e.g., a specialized integrated circuit, such as for example an Application Specific Integrated Circuit (ASIC) designed for only implementing an automated process for improving software editing technology associated with automating software editing tasks, generating actions associated with the software editing tasks, and modifying the editing tasks for future execution. Sensors/circuitry/logic 12 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 7 may include any type of network including, inter alia, a local area network, (LAN), a wide area network (WAN), the Internet, a wireless network, etc.

System 100 enables the following engines/modules (within hardware controller) for improving user interface technology associated with cognitive document/software lifecycle management:

A user interface (UI) configured to allow a user to interact with each of the remaining components.

A document ingestion and preprocessing engine configured to prepare documents for input into a document storage database. The document ingestion and preprocessing engine is configured to prepare documents for storage. The preparation process includes extracting metadata from documents (including a title, section headers, document labels/classes, if present, etc.) and parsing the document into sections of text thereby enabling system 100 to track changes while preserving the structure of the original document. The parsing process allows for automatic renumbering of paragraphs if sections are added or deleted.

A storage module (including databases) for storing documents, metadata, and edits made to the documents.

A version engine for managing version control of the documents.

A review engine for managing a document review lifecycle, creating and maintaining editor profiles, assigning users to documents, and alerting document owners/reviewers to changes of the document status. The review engine includes a text editor configured to allow a user to view and modify text as well as view recommendations from cognitive engines.

A cognitive recommendation engine configured to provide automation for editing tasks such as term standardization, readability improvement, cross-document consolidation, topical coherence, and spelling and grammatical errors. The cognitive recommendation engine executes machine learning feedback to improve recommendations based on user behavior by analyzing user activity and providing input to allow suggestions from the recommendation engine to adapt and better reflect user behavior. The basis for the feedback includes an analysis of the differences between original text and modified text after the user has received suggestions from a readability engine. The differences are configured to determine whether each suggestion was accepted (e.g., the user addressed the issue identified) or ignored (e.g., the issue remains despite being identified by the readability engine as a problem). Both classifications (accept or ignore) are used to improve future recommendations such that when a recommendation is generated, it is assigned a predictive score indicating a likelihood that a user will execute a suggested change. The scores are used to rank all possible recommendations to provide the most relevant options to the user. Accepted changes encourage system 100 to keep executing a same recommendation and assign a higher score to the choice selected by the user. Likewise, ignored recommendations encourage system 100 to disable the recommendation in the future such that (over time) recommendations executed by system 100 accurately reflect user activity and promote user productivity by generating high-confidence recommendations. Additionally, system 100 provides cognitive automation to identify editing tasks required to complete a document review and identify best resources (editors) to complete the editing tasks. Suggestions and flags are stored from the cognitive recommendation engine at a paragraph level, thereby enabling system 100 to track changes made, analyze which recommendations were accepted or rejected, and appropriately update future recommendations to adapt to user activity. All changes made to a single document are consolidated into a matrix and reported back to the user or to other reviewers to summarize the edits made to a document by the desired level of granularity.

An approval flow manager engine configured to monitor user permissions and alert users when approvals are required to continue the review process such that system 100 learns from user activity to improve recommendations in which system 100 learns rules automatically without explicit input from the user.

An effort requirement engine configured to provide a measure of the difficulty of an editing task to be completed. The difficulty assessment depends on a task type (e.g., a spelling correction is easier than a consolidation effort) and the magnitude of the editing task (e.g., a consolidation of two paragraphs is easier than a consolidation of two multi-paragraph sections of text).

An optimization engine configured to optimize a process for assigning tasks to editors using editor profiles. Generation of editor profiles is executed from editor actions in system 100. For example, an editor is assigned a set of tasks and system tracks an amount of time that the editor is logged in to complete the tasks. When all tasks are complete/addressed, a document passes to review by an approver. The approver may evaluate the edits made and choose to accept or reject the changes made by the editor. This set of data (consisting of the editor id, the task id, and the time to completion) is used to update the productivity parameters of the editor profile for the task type. This update is performed by evaluating the probability that the editor's changes will be approved, conditioned on the type of task, the difficulty of the task, the time to completion, and the editor's profile parameters. As new data is detected, these probabilities are re-calculated and editor profiles are updated to best explain the observed data (e.g., maximum likelihood methods). The optimization engine is designed to provide the optimal staffing of editors to the tasks identified by system 100. The optimization may be thought of as occurring in two nested stages. For a single task, system 100 may choose the editor with the maximum probability of the task be accepted based on the type of task, the difficulty of the task, and the editor profile parameters. An individual assignment will generate an estimate of the time to completion, based on the task type, difficulty of the task, and the profile parameters of the editor selected. The individual optimal assignments are subject to global constraints including, inter alia, a deadline for the review, individual staffing constraints (e.g., an editor is only available 10 hours a week), and permissions (certain editors may or may not be allowed to edit certain documents based on the organizational structure). The optimization is performed using mathematical/constraint programming to ensure that staffing constraints are satisfied while optimizing the probability of success of the tasks.

Figure 2:
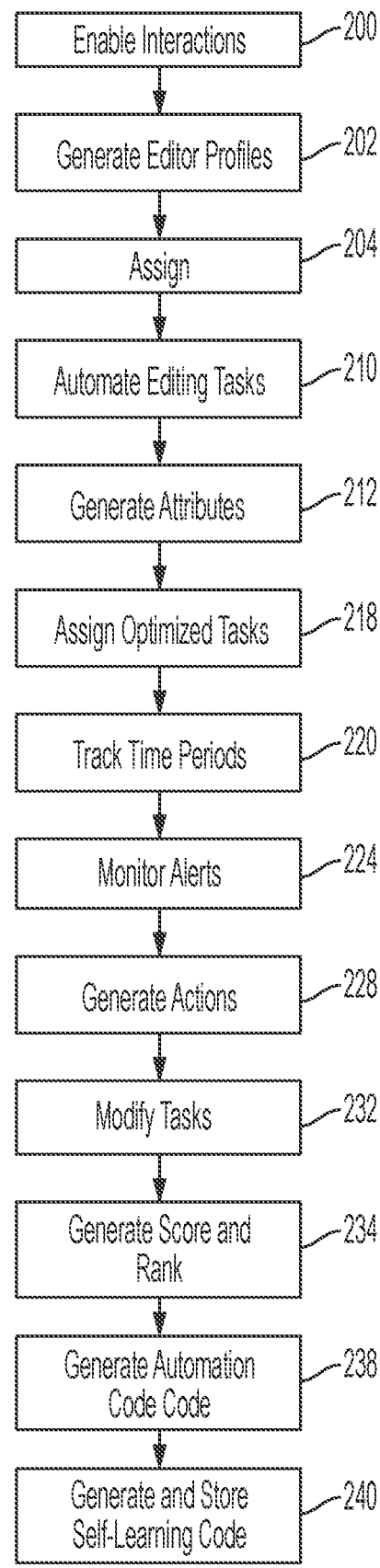
FIG. 2 illustrates an algorithm detailing a process flow enabled by the system of FIG. 1 for improving software editing technology associated with automating software editing tasks, generating actions associated with the software editing tasks, and modifying the editing tasks for future execution, in accordance with embodiments of the present invention.

FIG. 2 illustrates an algorithm detailing a process flow enabled by system 100 of FIG. 1 for improving software editing technology associated with automating software editing tasks, generating actions associated with the software editing tasks, and modifying the editing tasks for future execution, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware controller 14, database systems 25, and user interface 29. In step 200, interactions between a user and a hardware controller are enabled by a user interface. In step 202, editor profiles are generated. The editor profiles are associated with editing privileges of the user. The editor profiles include parameters associated with editor productivity attributes with respect to task types executed by the user. In step 204, the user is assigned to specified documents. Assigning the user to specified documents may include: preparing the specified documents for storage by extracting metadata from the specified documents; and parsing the specified documents into sections of text thereby enabling the hardware controller to track changes of the specified documents.

In step 210, editing tasks of the user are automated. The editing tasks are associated with the task types (of step 202). The editing tasks include standardization tasks, readability improvement tasks, cross-document consolidation tasks, topical coherence tasks, and spelling and grammatical error tasks. In step 212, task difficulty attributes associated with a difficulty of executing the editing tasks are generated. In step 218, an optimized version of the editing tasks is assigned to software editors based on the task difficulty attributes and the editor profiles. In step 220, time periods associated with the software editors completing the editing tasks are tracked. In step 224, user permissions and alerts are monitored. The user permissions and alerts are associated with approvals required to continue an editing task review process. In step 228, recommendation actions associated with the editing tasks are generated based on results of step 224. Generating the recommendation actions may include: executing machine learning feedback code; analyzing user activity associated with the recommendation actions; and associating said user activity with the editing tasks.

In step 232, the editing tasks are modified for future execution based on the recommendation actions and detected user activity associated with the editing tasks. In step 234, a predictive score associated with each predicted user change associated with modifying the editing tasks in accordance with the recommendation actions is generated and the recommendation actions are ranked based on each predictive score. Step 232 may be further executed based on results of the ranking. Additionally, domain-specific requirements may be incorporated with the editing tasks.

In step 238, cognitive automation code is generated. The cognitive automation code is enabled for identifying first tasks of the editing tasks required for completing a document review of the specified documents. In step 240, self-learning software code for executing future processes associated with executing a machine learning document lifecycle editing and memory reorganization method is generated and stored within a modified portion of a memory structure of the hardware controller.

Figure 3:
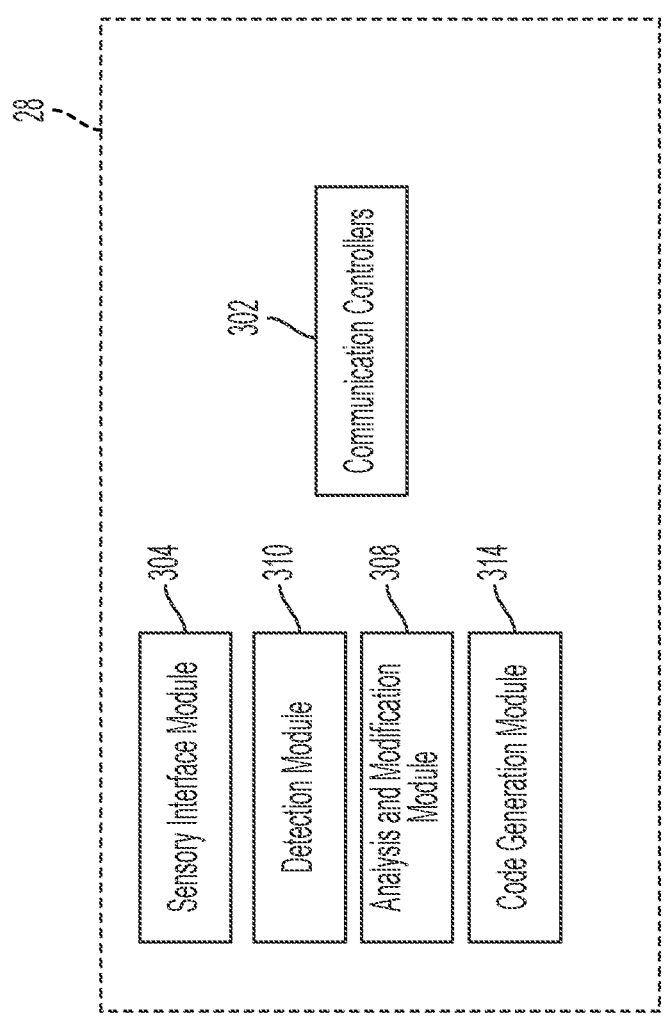
FIG. 3 illustrates an internal structural view of the self-learning software/hardware code/engines of FIG. 1, in accordance with embodiments of the present invention.

FIG. 3 illustrates an internal structural view of self-learning software/hardware code engines 28 of FIG. 1, in accordance with embodiments of the present invention. Self-learning software/hardware structure 121 includes a sensor interface module 304, a detection module 310, an analysis and modification module 308, a code generation module 314, and communication controllers 302. Sensor interface module 304 comprises specialized hardware and software for controlling all functions related to sensors/circuitry/logic 12 of FIG. 1. Detection module 310 comprises specialized hardware and software for controlling all functionality related to implementing the process described with respect to the algorithm of FIG. 2. Analysis and modification module 308 comprises specialized hardware and software for controlling all functions related to the analysis, generation, and modification steps of FIG. 2. Code generation module 314 comprises specialized hardware and software for controlling all functions related to generating all code and machine learning feedback for generating self-learning software code for executing future processes associated with executing the user interface modification method of the algorithm of FIG. 2. Communication controllers 302 are enabled for controlling all communications between sensor interface module 304, detection module 310, analysis and modification module 308, and code generation module 314.

Figure 4:
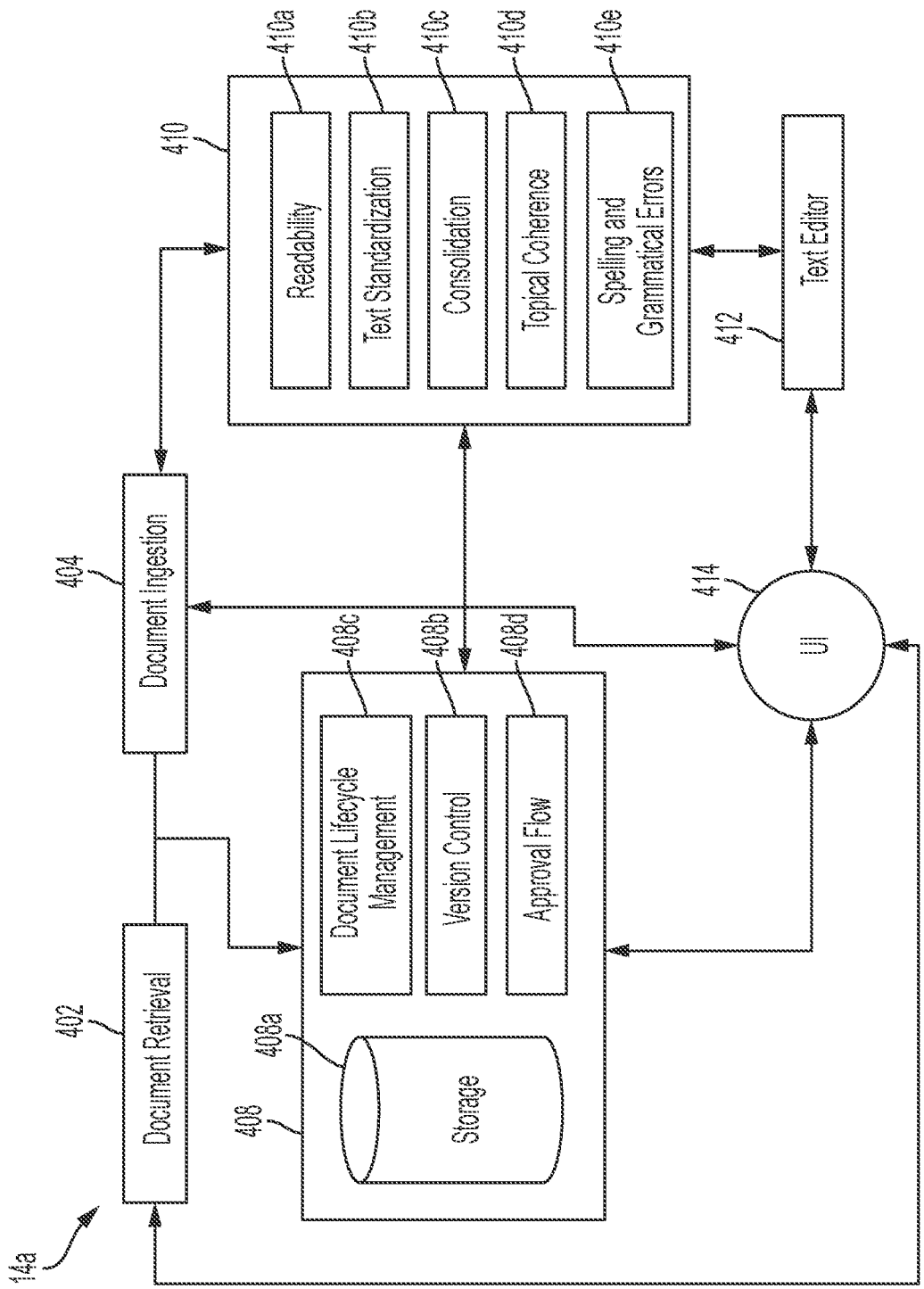
FIG. 4 illustrates a detailed internal view of the hardware controller of FIG. 1 associated with improving interface technology associated with document lifecycle management, in accordance with embodiments of the present invention.

FIG. 4 illustrates a detailed internal view 14a of hardware controller 14 of FIG. 1 associated with improving interface technology associated with document lifecycle management, in accordance with embodiments of the present invention. The detailed internal view 14a includes: a document ingestion and preprocessing engine 404 (for retrieving documents 402), a document storage and version control module 408, a text editor module 412, a user interface 414, and hardware/software systems 410 embedded into the text editor module 412 to automate editing tasks. Hardware/software systems 410 may include, inter alia;

1. A readability engine 410a to suggest improvements to simplify text.
2. A standardization engine 410b to flag technical terms, acronyms, and provide definitions and/or expansions.
3. A engine 410c to identify cross-document opportunities for consolidation.
4. An engine 410d to identify document topic coherence.
5. An engine 410e to identify spelling and grammatical errors.
6. A user interface (UI) 414

The detailed internal view 14a may further include: an edit tracker to track changes (i.e., made to documents, a type of change (e.g., grammatical, readability, consolidation, etc.), a user who made the change, and a date and time of the change); computing systems to analyze the tracked edits (including: an engine to update editing task identification, an engine to create and update editor profiles, and an engine to assign editors to document reviews); an approval flow manager; and a document formatting and export module.

Hardware controller 14 provides an improved cognitive automation process/software/hardware applied to a document review lifecycle process. Hardware controller consolidates all aspects of document review into a single end-to-end system via execution of machine learning code for continuously adjusting recommendations and editor profiles based on user activity with the system.

UI 414 is configured to enable a user to interact with each of the components of FIG. 4. Document ingestion and preprocessing engine 404 is configured to prepare documents for input into a document storage database 408a including databases for storing documents and metadata in combination with edits made to documents. Document storage and version control module 408 comprises an engine 408b for managing version control, an engine 408c for managing the document review lifecycle, creating and maintaining editor profiles, assigning users to documents, and alerting document owners/reviewers to changes in the document status. Text editor 412 allows a user to view and modify text as well as view recommendations from the cognitive engines.

Hardware controller 14 may include cognitive recommendation engines for providing automation for editing tasks such as term standardization, readability improvement, cross-document consolidation, topical coherence, and spelling and grammatical errors. An approval flow manager 408d (internal to document storage and version control module 408) is configured to monitor user permissions and alerts users when approvals are required to continue the review process.

Document ingestion and preprocessing engine 404 is configured to prepare documents for storage including; extracting metadata from documents (including the title, section headers, other document labels/classes, etc.) and parsing the document into sections of text. Parsing and storing the document by sections allows hardware controller 14 to track changes while preserving the structure of the original document (e.g., a document with paragraph numbering, chapters, embedded tables or images, etc.). The parsing process allows for automatic renumbering of paragraphs if sections are added or deleted. Hardware controller 14 additionally stores suggestions and flags from the cognitive recommendation engine at a paragraph level thereby enabling hardware controller 14 to track changes made, analyze which recommendations were accepted or rejected, and appropriately update future recommendations to adapt to user activity. All changes made to a single document may be consolidated into a matrix and reported back to the user or to other reviewers to summarize the edits made to a document by the desired level of granularity.

Additional functionalities enabled by document storage database 408a include a version control and document lifecycle management engine (engine 408c). Engine 408c is configured to keep track of previous versions of a document to enable users to revert back to old versions if desired. Engine 408c is additionally configured to keep track of which users edited which documents and when as well as metadata related to the individual edits themselves (e.g., type of edit, text before and after the edit, response to system recommendation (accept vs. ignore), etc.). Engine 408c further tracks the status of each document in the database (e.g., currently published, review required, in review, in approval chain, etc.) and manages which users have permission to view or edit which documents and keeps track of which users need to sign off on documents before they can advance to the next stage of the review lifecycle. Additionally, engine 408c builds editor profiles from edit data to determine editor skill sets and productivity scores. The editor skill set and productivity scores are used to assign editors to document editing tasks. Editor profiles are built from the stored edit data. Metrics are computed to analyze the number and types of edits that have been assigned to an editor, the proportion of the edits addressed by editor, the responses of the editor to the assigned tasks (whether the editor accepted the recommendation, ignored the recommendation, or provided their own solution), the time spent by the editor on a document, the time spent on each type of edit, and the success rate of the edits made by an editor as measured by the proportion of edits that end up in the final version of the document. In addition to these editor-specific metrics, other information, including the number of edits assigned to an editor that were left unattended and/or completed by another editor are analyzed. Each of these features is used to generate a predictive score indicating the likelihood that an editor will be able to complete an editing task in the time allotted by a document deadline.

Approval flow manager 408d communicates a document lifecycle to associated users based on a document status as given in engine 408c. This includes maintaining user/manager permissions and notifying users when reviews or approvals are required in order for a document to move to the next stage of the review lifecycle.

Text editor 412 allows users to view and modify text from documents in the storage database 408a based on user permissions. These changes are stored, tracked, and analyzed as described above. Text editor 412 provides recommendations to the user based on five main cognitive linguistic modules: (readability improvement) engine 410a, (standardization) engine 410b, (cross-document consolidation) engine 410c, (topical coherence) engine 410d, and (spelling and grammar) engine 410e. The edit recommendations identified by the engines are each scored to assess the difficulty of the edit task as well the estimate the effort/time required to complete. Features used to generate these estimates include a type of task (e.g., a consolidation task is more difficult than a single spelling error), a length of text involved in the editing task, and skill set and productivity metrics available in the editor profiles. These estimates, along with the edit recommendations themselves and the editor assignments, are updated based on user activity with hardware controller 14.

Engine 410a utilizes natural language processing (NLP) techniques to identify areas in text that are difficult to understand as measured by standard readability metrics (e.g., Gunning-Fog, Dale-Chall, Flesch-Kincaid, etc.). Engine 410a identifies words, phrases, and sentences in text that contribute to a higher readability score (indicating higher difficulty of understanding), as well as other linguistic features that may not be included in readability metrics but also provide a challenge to readability. When appropriate, engine 410a provides recommendations for simplifying the features identified as difficult to understand.

Engine 410b provides cognitive automation of standardization tasks common to document review. This includes pattern recognition (e.g., identifying phone numbers, email and web addresses, etc.) and term identification. Given a set of terms (and, optionally, definitions), engine 410b may automatically identify occurrences of these terms in the text. If definitions are given, engine 410b amy prompt the user to automatically add a definition in the text or to a glossary of the document. This is particularly helpful when documents contain specialized terms or jargon that must be preserved but also must be used carefully so as not to alienate or confuse readers unfamiliar with the terms used. Engine 410b additionally includes applications with expanding (or contracting) acronyms.

Engine 410c utilizes NLP techniques and code (e.g., term-frequency inverse-document-frequency (TF-IDF) scores, topic modeling, cosine similarity of word vectors, etc.) to identify areas of overlap between several documents. These areas are brought to the attention of the user to enable the user to decide whether the similar content in several documents needs to remain or may be consolidated.

Engine 410d utilizes NLP techniques and code (e.g., topic modeling via latent Dirichlet allocation (LDA), text summarization, etc.) to identify the number of topics present in a document as well of the conciseness of their presentation by assigning a clarity score to each topic. Documents (or sections) that contain a high volume of disparate topics or topics presented with low clarity will be identified to the user to either move information into new documents or edit sections to become clearer.

Engine 410e enables hardware controller 14 to understand which users are most capable of addressing errors. Additionally, hardware controller 14 learns from user activity to improve recommendations.

A further innovation of the recommendation engines (of hardware controller 14) is the use of machine learning feedback to improve recommendations based on user behavior. The machine learning feedback engine analyzes user activity and provides input to allow suggestions from each recommendation engine to adapt and better reflect user behavior. The main basis for this feedback is for analyzing the differences between the original text and the modified text after the user has received suggestions from engine 410a. These differences determine whether each suggestion was accepted (i.e., the user addressed the issue identified) or ignored (i.e., the issue remains despite being identified by the readability engine as a problem).

Both classifications (accept or ignore) are used to improve future recommendations. When a recommendation is generated, it is assigned a predictive score indicating the likelihood that a user will make the suggested change. These scores are used to rank all possible recommendations to provide the most relevant options to the user. Accepted changes encourage hardware controller 14 to keep making the same recommendation and assign a higher score to the choice made by the user. Ignored recommendations encourage hardware controller to not make the recommendation in the future. Over time, the recommendations made by hardware controller 14 accurately reflect user activity and promote user productivity by making high-confidence recommendations.

Figure 5:
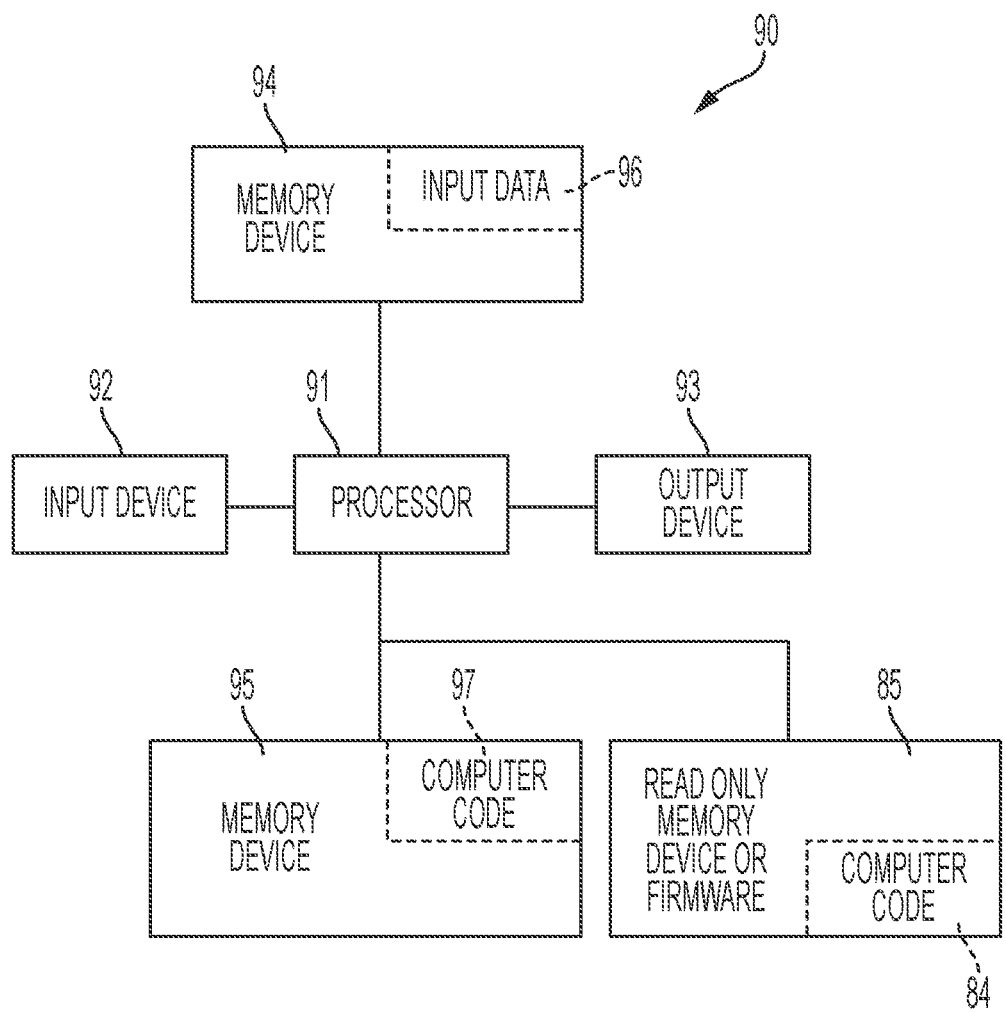
FIG. 5 illustrates a computer system used by the system of FIG. 1 for improving software editing technology associated with automating software editing tasks, generating actions associated with the software editing tasks, and modifying the editing tasks for future execution, in accordance with embodiments of the present invention.

FIG. 5 illustrates a computer system 90 (e.g., hardware controller 14, database systems 25, and user interface 29 of FIG. 1) used by or comprised by the system 100 of FIG. 1 for improving software editing technology associated with automating software editing tasks, generating actions associated with the software editing tasks, and modifying the editing tasks for future execution, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving software editing technology associated with automating software editing tasks, generating actions associated with the software editing tasks, and modifying the editing tasks for future execution. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software editing technology associated with automating software editing tasks, generating actions associated with the software editing tasks, and modifying the editing tasks for future execution. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software editing technology associated with automating software editing tasks, generating actions associated with the software editing tasks, and modifying the editing tasks for future execution. In another embodiment, the invention provides a business method that performs the process steps of the invention on a subscription, advertising, and/or fee basis. That is, a service supplier, such as a Solution Integrator, could offer to enable a process for improving software editing technology associated with automating software editing tasks, generating actions associated with the software editing tasks, and modifying the editing tasks for future execution. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
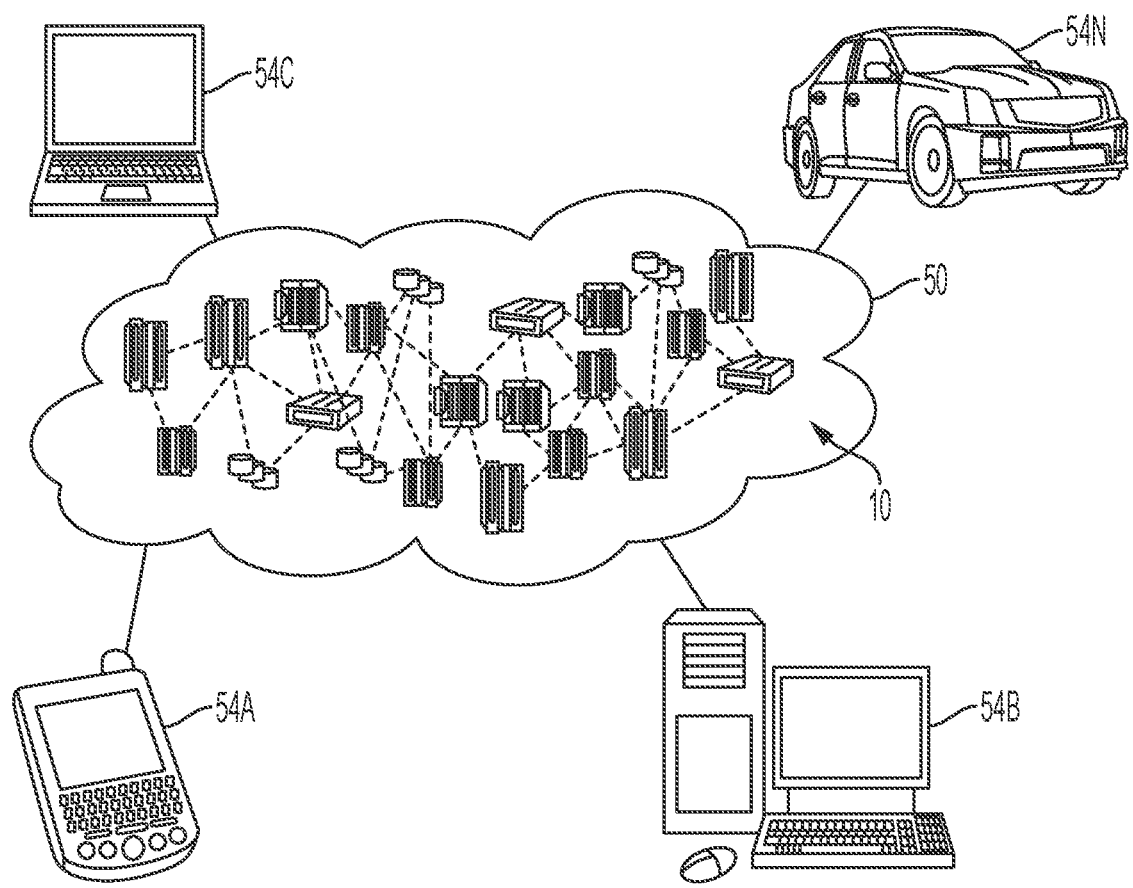
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
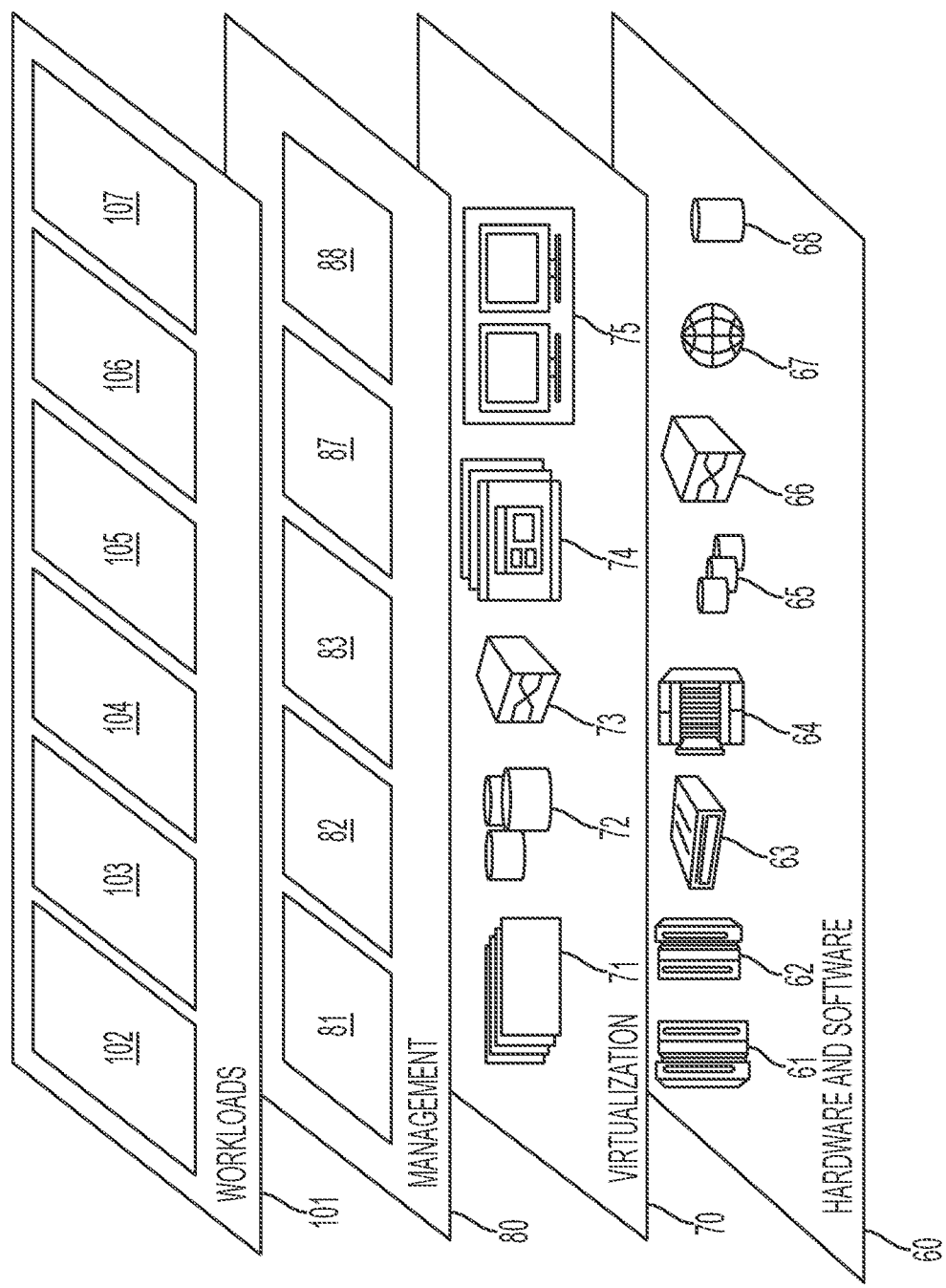
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving software editing technology associated with automating software editing tasks, generating actions associated with the software editing tasks, and modifying the editing tasks for future execution 108.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A machine learning document lifecycle editing and memory reorganization method comprising:

enabling, by a user interface via a processor of a hardware controller, interactions between a user and hardware components of said hardware controller;

generating, by said processor executing a profile engine of said hardware controller, editor profiles associated with editing privileges of said user, wherein said editor profiles comprise parameters associated with editor productivity attributes with respect to task types executed by said user;

updating, by said processor, said parameters by evaluating a probability that software editor changes will be approved and conditioned with respect to: a task type of said editing tasks, a difficulty of said editing tasks, a time to completion of said editing tasks, and said editor profile parameters;

assigning, by said processor executing said profile engine with respect to results of said updating, said user to specified documents;

automating, by said processor executing a cognitive recommendation engine of said hardware controller, editing tasks of said user, wherein said editing tasks are associated with said task types, and wherein said editing tasks comprise standardization tasks, readability improvement tasks, cross-document consolidation tasks, topical coherence tasks, and spelling and grammatical error tasks;

generating, by said processor executing an effort requirement engine of said hardware controller, task difficulty attributes associated with a difficulty of executing said editing tasks, wherein said generating task difficulty attributes is based on said task type and a magnitude of an editing task;

managing, by said processor executing a version engine, a version control of said specified documents;

assigning, by an optimization engine of said hardware controller based on said task difficulty attributes and said editor profiles, an optimized version of said editing tasks to hardware and software editors embedded within a text editor module;

tracking, by said processor executing hardware sensors, time periods associated with said software editors completing said editing tasks;

monitoring, by an approval flow manager engine executing hardware activity tracking sensors of said hardware controller, user permissions and alerts associated with approvals required to continue an editing task review process;
generating, by said processor based on results of said monitoring without explicit input from said user, recommendation actions associated with said editing tasks, wherein said generating said recommendation actions comprises:
executing machine learning feedback code;
analyzing user activity associated with said recommendation actions; and
associating said user activity with said editing tasks;
continuously adjusting, by said processor, said recommendation actions and said editor profiles based on sensor detected user activity;
analyzing, by said processor, acceptance or rejections of said recommendation actions; updating by said processor based on results of said analyzing said acceptance or rejections of said recommendation actions, future recommendation actions for adapting to user activity;
consolidating into a matrix, by said processor, modifications to said specified document; and
modifying, by said processor based on said updating said future recommendation actions, said recommendation actions, and said sensor detected user activity associated with said editing tasks, a functionality of said hardware controller resulting in a modification of said editing tasks for future execution.

2. The method of claim 1, further comprising: generating, by said processor, a predictive score associated with each predicted user change associated with said modifying said editing tasks in accordance with said recommendation actions; and ranking, by said processor based on each said predictive score, said recommendation actions, wherein said modifying said editing tasks is further based on results of said ranking.

3. The method of claim 1, further comprising: generating, by said processor, cognitive automation code for identifying first tasks of said editing tasks required for completing a document review of said specified documents; and identifying, by said processor, second tasks of said editing tasks required for completing said editing tasks, wherein said modifying said editing tasks is further based on said first tasks and said second tasks.

4. The method of claim 1, further comprising: incorporating, by said processor, domain-specific requirements with said editing tasks, wherein said modifying said editing tasks is further based on results of said incorporating.

5. The method of claim 1, wherein said assigning said user to specified documents comprises: preparing said specified documents for storage by extracting metadata from said specified documents; and parsing said specified documents into sections of text thereby enabling said hardware controller to track changes of said specified documents.

6. The method of claim 1, further comprising: generating, by said processor, self learning software code for executing future processes associated with executing said machine learning document lifecycle editing and memory reorganization method; and storing, by said processor, said self learning software code within a modified portion of a memory structure of said hardware controller.

7. The method of claim 1, further comprising:
providing at least one support service for at least one of creating, integrating, hosting, maintaining, and deploying computer-readable code in the control hardware, said code being executed by the computer processor to implement: said enabling, said generating said editor profiles, said assigning said user, said automating, said generating said task difficulty attributes, said assigning said optimized version of said editing tasks, said tracking, said monitoring, said generating said recommendation actions, and said modifying.

8. A computer program product, comprising a computer readable hardware storage device storing a computer readable program code, said computer readable program code comprising an algorithm that when executed by a processor of a hardware controller implements a machine learning document lifecycle editing and memory reorganization method, said method comprising:
enabling, by a user interface via said processor, interactions between a user and hardware components of said hardware controller;
generating, by said processor executing a profile engine of said hardware controller, editor profiles associated with editing privileges of said user, wherein said editor profiles comprise parameters associated with editor productivity attributes with respect to task types executed by said user;
updating, by said processor, said parameters by evaluating a probability that software editor changes will be approved and conditioned with respect to: a task type of said editing tasks, a difficulty of said editing tasks, a time to completion of said editing tasks, and said editor profile parameters;
assigning, by said processor executing said profile engine with respect to results of said updating, said user to specified documents;
automating, by said processor executing a cognitive recommendation engine of said hardware controller, editing tasks of said user, wherein said editing tasks are associated with said task types, and wherein said editing tasks comprise standardization tasks, readability improvement tasks, cross-document consolidation tasks, topical coherence tasks, and spelling and grammatical error tasks;
generating, by said processor executing an effort requirement engine of said hardware controller, task difficulty attributes associated with a difficulty of executing said editing tasks, wherein said generating task difficulty attributes is based on said task type and a magnitude of an editing task;
managing, by said processor executing a version engine, a version control of said specified documents;
assigning, by an optimization engine of said hardware controller based on said task difficulty attributes and said editor profiles, an optimized version of said editing tasks to hardware and software editors embedded within a text editor module;
tracking, by said processor executing hardware sensors, time periods associated with said software editors completing said editing tasks;
monitoring, by an approval flow manager engine executing hardware activity tracking sensors of said hardware controller, user permissions and alerts associated with approvals required to continue an editing task review process;
generating, by said processor based on results of said monitoring without explicit input from said user, recommendation actions associated with said editing tasks, wherein said generating said recommendation actions comprises:
executing machine learning feedback code;

analyzing user activity associated with said recommendation actions; and associating said user activity with said editing tasks;

continuously adjusting, by said processor, said recommendation actions and said editor profiles based on sensor detected user activity;

analyzing, by said processor, acceptance or rejections of said recommendation actions; updating by said processor based on results of said analyzing said acceptance or rejections of said recommendation actions, future recommendation actions for adapting to user activity;

consolidating into a matrix, by said processor, modifications to said specified document; and modifying, by said processor based on said updating said future recommendation actions, said recommendation actions, and said sensor detected user activity associated with said editing tasks, a functionality of said hardware controller resulting in a modification of said editing tasks for future execution.

9. The computer program product of claim 8, wherein said method further comprises: generating, by said processor, a predictive score associated with each predicted user change associated with said modifying said editing tasks in accordance with said recommendation actions; and ranking, by said processor based on each said predictive score, said recommendation actions, wherein said modifying said editing tasks is further based on results of said ranking.

10. The computer program product of claim 8, wherein said method further comprises: generating, by said processor, cognitive automation code for identifying first tasks of said editing tasks required for completing a document review of said specified documents; and identifying, by said processor, second tasks of said editing tasks required for completing said editing tasks, wherein said modifying said editing tasks is further based on said first tasks and said second tasks.

11. The computer program product of claim 8, wherein said method further comprises: incorporating, by said processor, domain-specific requirements with said editing tasks, wherein said modifying said editing tasks is further based on results of said incorporating.

12. The computer program product of claim 8, wherein said assigning said user to specified documents comprises: preparing said specified documents for storage by extracting metadata from said specified documents; and parsing said specified documents into sections of text thereby enabling said hardware controller to track changes of said specified documents.

13. The computer program product of claim 8, wherein said method further comprises: generating, by said processor, self learning software code for executing future processes associated with executing said machine learning document lifecycle editing and memory reorganization method; and storing, by said processor, said self learning software code within a modified portion of a memory structure of said hardware controller.

14. A hardware controller comprising a processor coupled to a computer-readable memory unit, said memory unit comprising instructions that when executed by the computer processor implements a machine learning document lifecycle editing and memory reorganization method comprising:

enabling, by a user interface via said processor, interactions between a user and hardware components of said hardware controller;

generating, by said processor executing a profile engine of said hardware controller, editor profiles associated with editing privileges of said user, wherein said editor profiles comprise parameters associated with editor productivity attributes with respect to task types executed by said user;

updating, by said processor, said parameters by evaluating a probability that software editor changes will be approved and conditioned with respect to: a task type of said editing tasks, a difficulty of said editing tasks, a time to completion of said editing tasks, and said editor profile parameters;

assigning, by said processor executing said profile engine with respect to results of said updating, said user to specified documents;

automating, by said processor executing a cognitive recommendation engine of said hardware controller, editing tasks of said user, wherein said editing tasks are associated with said task types, and wherein said editing tasks comprise standardization tasks, readability improvement tasks, cross-document consolidation tasks, topical coherence tasks, and spelling and grammatical error tasks;

generating, by said processor executing an effort requirement engine of said hardware controller, task difficulty attributes associated with a difficulty of executing said editing tasks, wherein said generating task difficulty attributes is based on said task type and a magnitude of an editing task;

managing, by said processor executing a version engine, a version control of said specified documents;

assigning, by an optimization engine of said hardware controller based on said task difficulty attributes and said editor profiles, an optimized version of said editing tasks to hardware and software editors embedded within a text editor module;

tracking, by said processor executing hardware sensors, time periods associated with said software editors completing said editing tasks;

monitoring, by an approval flow manager engine executing hardware activity tracking sensors of said hardware controller, user permissions and alerts associated with approvals required to continue an editing task review process;

generating, by said processor based on results of said monitoring without explicit input from said user, recommendation actions associated with said editing tasks, wherein said generating said recommendation actions comprises:

executing machine learning feedback code;

analyzing user activity associated with said recommendation actions; and associating said user activity with said editing tasks;

continuously adjusting, by said processor, said recommendation actions and said editor profiles based on sensor detected user activity;

analyzing, by said processor, acceptance or rejections of said recommendation actions; updating by said processor based on results of said analyzing said acceptance or rejections of said recommendation actions, future recommendation actions for adapting to user activity;

consolidating into a matrix, by said processor, modifications to said specified document; and modifying, by said processor based on said updating said future recommendation actions, said recommendation actions, and said sensor detected user activity associated with said editing tasks, a functionality of said hardware controller resulting in a modification of said editing tasks for future execution.

15. The hardware controller of claim 14, wherein said method further comprises: generating, by said processor, a predictive score associated with each predicted user change associated with said modifying said editing tasks in accordance with said recommendation actions; and ranking, by said processor based on each said predictive score, said recommendation actions, wherein said modifying said editing tasks is further based on results of said ranking.

16. The hardware controller of claim 14, wherein said method further comprises: generating, by said processor, cognitive automation code for identifying first tasks of said editing tasks required for completing a document review of said specified documents; and identifying, by said processor, second tasks of said editing tasks required for completing said editing tasks, wherein said modifying said editing tasks is further based on said first tasks and said second tasks.

17. The hardware controller of claim 14, wherein said method further comprises: incorporating, by said processor, domain-specific requirements with said editing tasks, wherein said modifying said editing tasks is further based on results of said incorporating.

\* \* \* \* \*